(12) United States Patent
Vicente et al.

(10) Patent No.: US 7,369,389 B2
(45) Date of Patent: May 6, 2008

(54) ELECTRONIC TRIP UNIT FOR CIRCUIT BREAKERS

(75) Inventors: Nataniel Barbosa Vicente, Prospect, KY (US); John J. Dougherty, Collegeville, PA (US); Michael S. Tignor, Watertown, CT (US)

(73) Assignee: General Electric Company, Schenectady, NY (US)

( * ) Notice: Subject to any disclaimer, the term of this patent is extended or adjusted under 35 U.S.C. 154(b) by 321 days.

(21) Appl. No.: 11/298,277

(22) Filed: Dec. 8, 2005

(65) Prior Publication Data

US 2007/0133140 A1 Jun. 14, 2007

(51) Int. Cl.
*H02H 3/00* (2006.01)
(52) U.S. Cl. .................................. 361/115; 361/75
(58) Field of Classification Search ............... 361/75, 361/115; 374/141; 702/130
See application file for complete search history.

(56) References Cited

U.S. PATENT DOCUMENTS

| | | | | |
|---|---|---|---|---|
| 5,038,246 A | 8/1991 | Durivage, III | ............... | 361/93 |
| 5,089,928 A | 2/1992 | Durivage, III | ............... | 361/94 |
| 5,115,371 A * | 5/1992 | Tripodi | ................ | 361/106 |
| 5,136,457 A | 8/1992 | Durivage, III | ............... | 361/93 |
| 5,136,458 A | 8/1992 | Durivage, III | ............... | 361/93 |
| 5,428,495 A | 6/1995 | Murphy | .................. | 361/85 |
| 5,875,088 A | 2/1999 | Matsko | .................. | 361/96 |
| 6,005,757 A | 12/1999 | Shvach | .................. | 361/64 |
| 6,252,365 B1 | 6/2001 | Morris | .................. | 318/455 |
| 6,310,753 B1 | 10/2001 | Dollar, II | ................ | 361/93.2 |
| 6,504,694 B1 | 1/2003 | Bilac | .................. | 361/93.2 |
| 6,710,988 B1 | 3/2004 | Yee | .................. | 361/23 |
| 6,876,532 B2 | 4/2005 | Engel | ................ | 361/93.8 |
| 2003/0202305 A1 | 10/2003 | Engel | ................ | 361/93.8 |
| 2005/0219032 A1 | 10/2005 | Williams | ................ | 337/3 |

* cited by examiner

*Primary Examiner*—Michael Sherry
*Assistant Examiner*—Danny Nguyen
(74) *Attorney, Agent, or Firm*—Cantor Colburn LLP

(57) ABSTRACT

An electronic trip unit for a circuit breaker is disclosed. The electronic trip unit has a processing circuit, a real time clock chip, and a power source for powering the real time clock chip in the absence of current in the circuit breaker. The processing circuit is responsive to input signals representative of a current in the circuit breaker, and productive of a trip signal for tripping the circuit breaker. The real time clock chip is in signal communication with the processing circuit. In response to an off event at the circuit breaker following a current flow condition thereat, the real time clock chip is configured to generate time information for use by the processing circuit, which is configured to apply the time information to calculate a cooling effect arising from the circuit breaker being off, thereby providing for thermal memory.

20 Claims, 2 Drawing Sheets

ELECTRONIC TRIP UNIT FOR CIRCUIT BREAKERS

BACKGROUND OF THE INVENTION

The present disclosure relates generally to circuit breakers and particularly to a trip unit for a circuit breaker.

Circuit breaker trip units and motor overload devices provide protection for cables, motors and other loads by measuring electrical current and simulating the heating of said cables, motors, and loads. One traditional approach uses bimetallic elements heated by current, another uses electronics to estimate heating as proportional to the current squared (I2R heating). In response to the opening of one of these devices, current is removed from the cables or loads to allow cooling. In electronic trip unit applications, many of these protective devices derive operating power from the load current and will de-energize and re-initialize following an open-close operation, allowing a user to reset the circuit breaker or motor overloads immediately. However, the cables, motors, and loads may have long thermal time constants and may not have had proper time to cool. This may cause equipment damage if heat arising from a first trip event remains in the motor or other load. Some thermal memory methods depend upon the storage of charge within a capacitor to simulate accumulated heat. However, in applications where the thermal time constants may be longer than capacitors can reliably hold an accurate charge, excessive heat may remain if a circuit breaker is turned back on too soon following a trip event. Alternative thermal memory methods may employ a thermal device that is heated by the current, such as a thermistor, for example. However, the load may have a larger thermal mass (and therefore take longer to cool) than some of the utilized thermal devices. While existing circuit breakers are considered suitable for their intended purpose, the art of circuit breakers may be advanced by providing a trip unit with enhanced thermal memory to improve protection for equipment with large thermal time constants.

BRIEF DESCRIPTION OF THE INVENTION

An embodiment of the invention includes an electronic trip unit for a circuit breaker. The electronic trip unit has a processing circuit, a real time clock chip, and a power source for powering the real time clock chip in the absence of current in the circuit breaker. The processing circuit is responsive to input signals representative of a current in the circuit breaker, and productive of a trip signal for tripping the circuit breaker. The real time clock chip is in signal communication with the processing circuit. In response to an off event at the circuit breaker following a current flow condition thereat, the real time clock chip is configured to generate time information for use by the processing circuit, which is configured to apply the time information to calculate a cooling effect arising from the circuit breaker being off, thereby providing for thermal memory.

Another embodiment of the invention includes an electronic trip unit for a circuit breaker having a processing circuit, a real time clock chip, a power source for powering the real time clock chip in the absence of current in the circuit breaker, and a storage medium. The processing circuit is responsive to input signals representative of a current in the circuit breaker, and productive of a trip signal for tripping the circuit breaker. The real time clock chip is in signal communication with the processing circuit. The storage medium stores instructions, which the processing circuit may read and execute. Time information is generated by the real time clock chip in response to an off event at the circuit breaker following a current flow condition thereat, and applied to calculate a cooling effect arising from the circuit breaker being off and cooling down, thereby providing a thermal memory function.

BRIEF DESCRIPTION OF THE DRAWINGS

Referring to the exemplary drawings wherein like elements are numbered alike in the accompanying Figures.

DETAILED DESCRIPTION OF THE INVENTION

In an embodiment, an electronic trip unit for a circuit breaker has a low power real-time clock chip to provide measurement of elapsed time following a trip event that may be used to calculate cooling. A microprocessor-based trip unit records the current flowing through a circuit breaker or motor overload relay via current transformers (CTs), amplifiers and A/D converters. Prior to a trip event, the microprocessor accumulates a value proportional to the current I (often the square of current) over time, which is known in the industry as $I^2t$, or more specifically, the integral of $I^2*dt$ over time t. If the load current exceeds a defined pickup value, the accumulator increases in value and, if a threshold is reached, the trip unit opens the breaker or motor contactor.

In an embodiment, the microprocessor, prior to a trip event or during a power loss, stores the accumulator value and the present value of the real time clock in non-volatile memory. During a power loss, the real time clock may be powered by a supercapacitor, a battery, or some other power source, such as a 24-volt DC external power supply for example. Some supercapacitors are capable of maintaining low power real time clock chips for 21 days or more, which usually more than exceeds the cooling requirement for a given load.

Following the return of power to the trip unit, the microprocessor reads the accumulator and time values, stored in memory at the time of trip or power loss, and the real time clock value. Using the elapsed time information provided by the real time clock, the microprocessor calculates the amount of cooling that must be applied to the accumulator. Since the real time clock may be maintained for 21 days, almost any reasonable load thermal time constant may be accurately applied, as will be discussed in more detail below.

An Input/Output device enables the user to modify as well as over-ride the cooling effect calculation as conditions warrant. User selected algorithms via the Input/Output device allow a variety of thermal properties for different electrical loads to be represented, increasing simulation accuracy.

Figure 1:
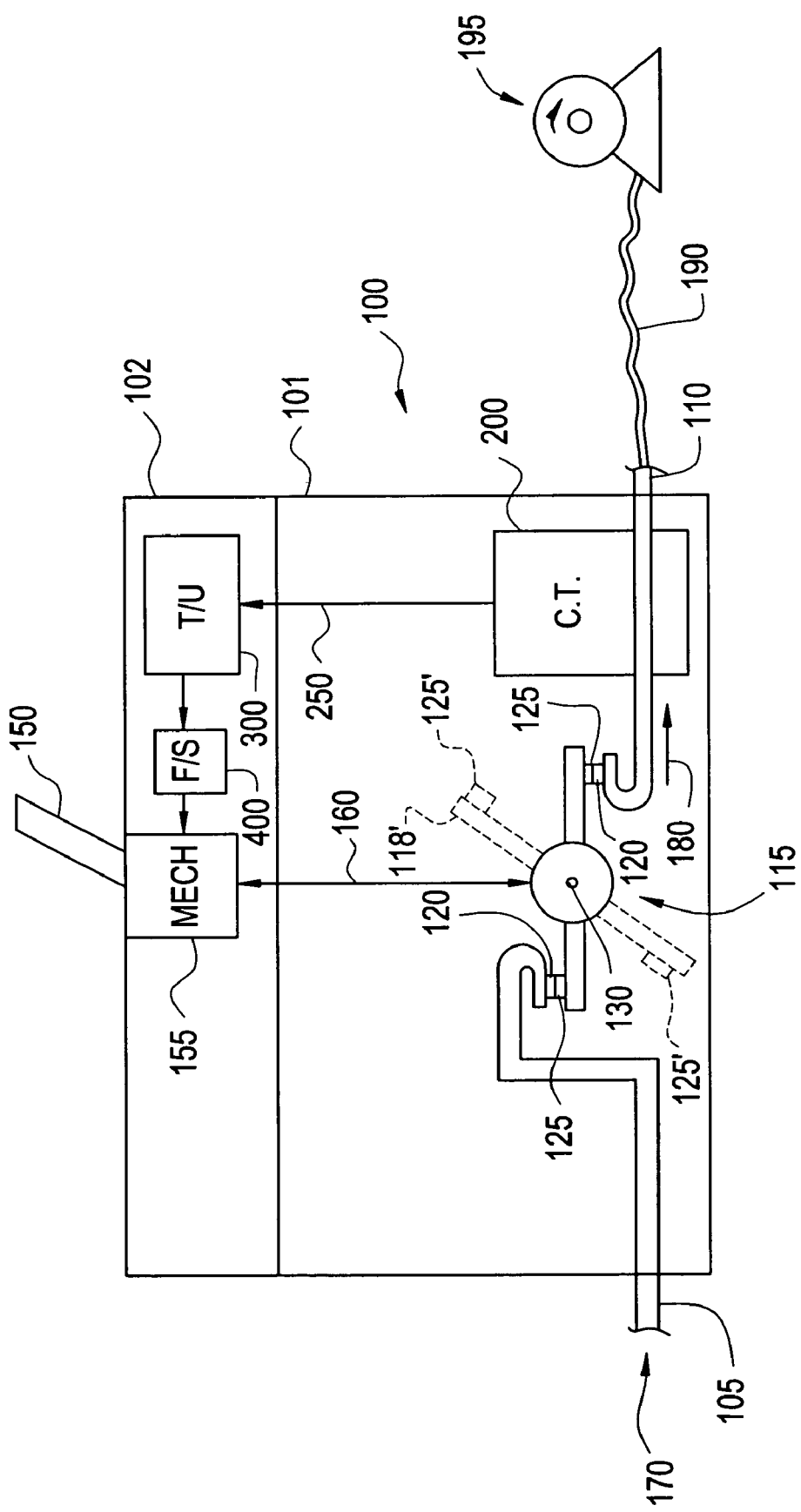
FIG. 1 depicts in cross section view a schematic circuit breaker and motor load for use in accordance with an embodiment of the invention.

An exemplary circuit breaker 100 is depicted in FIG. 1 having a base 101 and a cover 102, connected by a set of power cables 190 to an electrical load 195 (a motor for example). Within the base 101 and the cover 102 of the circuit breaker 100 are a contact arm assembly 115, a line strap 105, and a load strap 110. The contact arm assembly includes a contact arm 118 and a set of movable contacts 125 disposed at opposite ends thereof. Disposed on the line strap 105 and the load strap 110 are a set of fixed contacts 120. When the contact arm assembly 115 is in the CLOSED position, movable contacts 125 are in mechanical and electrical connection with fixed contacts 120. An operating mechanism 155 with a handle 150 is used via a linkage 160 to turn the circuit breaker 100 ON and OFF in a manner known in the art. The contact arm 118 represented with solid lines in FIG. 1 depicts the condition where the handle 150 and operating mechanism 155 have positioned the contact arm assembly 115 in the ON position, creating a CLOSED conduction path 170 for the primary current, illustrated by arrow line 180, to flow to the load 195. As used herein, conduction path 170 refers to the line strap 105, the contact arm 118 with a pair of movable contacts 125 at opposite ends thereof, the pair of fixed contacts 120 disposed on the line strap 105 and load strap 110, and the load strap 110. The operating mechanism 155 is configured to open and close the conduction path 170 via linkage 160 by rotating the contact arm assembly 115 about its central axis 130 thereby separating and closing the movable contacts 125 from the fixed contacts 120. For reference, dashed lines depict a contact arm 118' with an OPEN conduction path 170. An amount of heat is generated within the power cables 190 and the load 195 as a result of, and that is proportional to, the flow of primary current 180 through the power cables 190 and the load 195. While the embodiment described herein depicts a single rotary double-break contact arm 115, it will be appreciated that the disclosed invention is also applicable to other types of circuit breakers such as multi-pole, or single contact arrangements, for example.

In an embodiment, the circuit breaker 100 includes a current transformer 200 that is magnetically coupled to the load strap 110, a trip unit 300 that is in signal communication with the current transformer 200, and a flux shifter 400 that is in signal communication with the trip unit 300 and mechanically linked to the operating mechanism 155. As the primary current flows through the load strap 110, the current transformer 200 creates a proportional secondary current, which flows through conductor 250 to provide both power and a current signal to a trip unit 300, where the current signal is proportional to the level of current in the load strap 110. The trip unit 300 monitors the secondary current signal as an indication of the primary current flowing through the circuit breaker 100 and to the load 195. In response to an over current condition sensed by the trip unit 300, the trip unit 300 activates the flux shifter 400 to operate the mechanism 155, causing the linkage 160 to rotate the contact arm assembly 115 counter clockwise about its central axis 130 and interrupt the conduction path 170, thereby removing current from the load 195.

Figure 2:
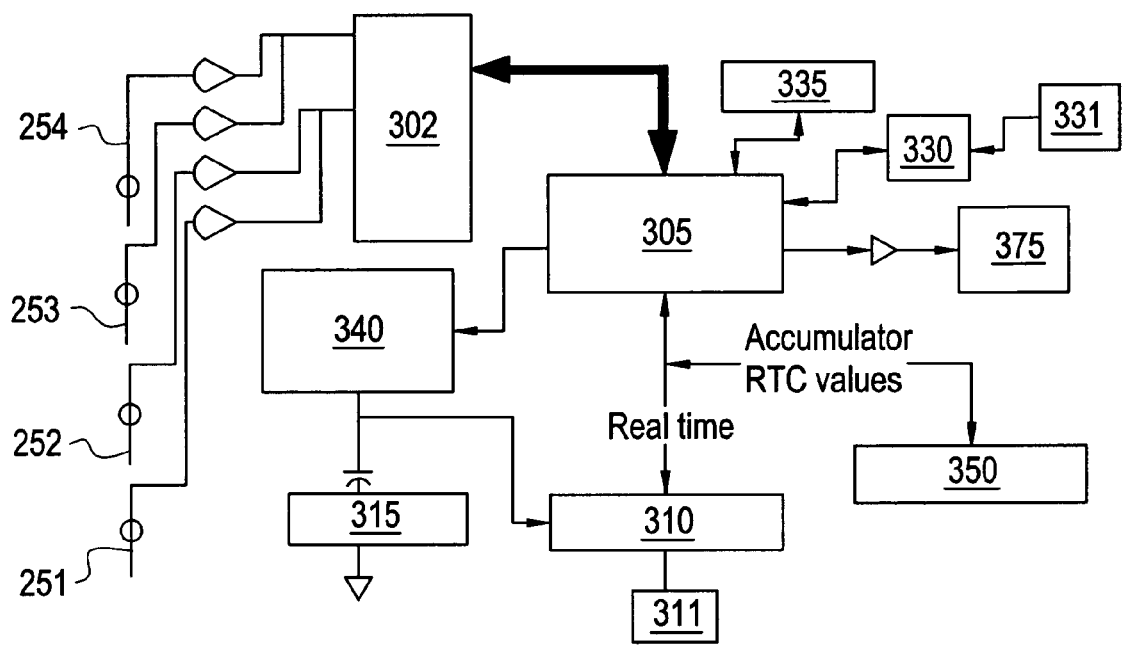
FIG. 2 depicts an exemplary trip unit schematic control diagram in accordance with an embodiment of the invention.

Referring to FIG. 2, an embodiment of the trip unit 300 for a three-phase circuit breaker with neutral connection is depicted. Secondary current signals from each of four current transformers 200 are shown to be in signal communication with an analog to digital converter 302 via conductors 251, 252, 253, and 254. In an embodiment, trip unit 300 includes a processing circuit (also herein referred to as a microprocessor) 305 that is in signal communication with the analog to digital converter 302, a non-volatile memory storage 350, an accumulator 335, a real time clock chip 310, an input/output (I/O) device 330, a supercapacitor control 340 for controlling the charging of a supercapacitor 315, and a trip capacitor 375. In an embodiment, the real time clock chip 310 is a 5-volt lower power clock chip. Although not depicted in FIG. 2, the microprocessor 305, supercapacitor control 340, and trip capacitor 375 receive power from a power supply that is energized by the current transformers 200. In an embodiment, the real time clock chip 310 receives power from the aforementioned power supply during normal operation, and from the supercapacitor 315 or an auxiliary battery 311 following a trip event. While the embodiment described herein depicts a trip unit 300 as part of a three phase circuit breaker 100, it will be appreciated that the disclosed invention is also applicable to other circuit breakers 100, such as one, two, or three pole circuit breakers 100, for example.

The analog to digital converter 302 converts the secondary current levels from the current transformers 200 to digital signals, which are then communicated to the microprocessor 305 for analysis. The heat generated within a specific load 195 is a function of both the amount of current and the time for which that current flows through the load 195, which is referred to in the art as $I^2t$ heating. The microprocessor 305 is programmed to calculate the $I^2t$ heating effect that is passed to the load 195 in response to the flow of primary current. For example, if the secondary current levels exceed a particular value for a specific time period, the microprocessor 305 will increment the accumulator 335. Alternatively, if the secondary current falls beneath a particular value for a certain period of time, the microprocessor 305 will decrement the accumulator 335. Accordingly, the value of the accumulator 335 is a representation of the $I^2t$ heating effect at the load 195. The input/output device 330 allows a user to select from a variety of cooling algorithms, which represent a variety of thermal behaviors for different loads 195, and which will be discussed in more detail below.

If the value of the accumulator 335 exceeds a threshold, such as an overload threshold value for example, the microprocessor 305 provides a signal to the trip capacitor 375 to fire the flux shifter 400, which in turn opens the circuit breaker 100 and interrupts the flow of current through the circuit breaker 100. In response to the microprocessor 305 sending the trip signal, it also sends the stored value of the accumulator 335 and the available real-time value of the real time clock 310 to the non-volatile memory 350, which maintains the integrity of the data in the absence of power. Following a trip event, and in response to power being returned to the trip unit 300, by turning the circuit breaker 100 back on for example, the microprocessor 305 retrieves the accumulator value and the time relating to the trip event from the non-volatile memory 350, and receives present time information from the real time clock chip 310, which enables the microprocessor 305 to determine how much time has elapsed since the trip event. The duration of current interruption following the trip event may then be used by the microprocessor 305 to establish a cooling effect at the load 195. Based upon a desired operational thermal characteristic (discussed further below) selected via the input/output device 330, the microprocessor calculates how much effective cooling has occurred, thereby providing for thermal memory of the heating that occurred prior to the trip event. Provided with this thermal memory information, the microprocessor 305 may reestablish an overload protection scheme at an appropriate point on a temperature-time curve, thereby enhancing protection if the load 195 is exposed to cyclic overload conditions.

As discussed previously, the microprocessor 305 may be programmed to calculate effective cooling by using one of a plurality of decay functions, which may be of the following form for example:

$$Accum(t) \equiv Accum(t_0) * \exp^{-\frac{t}{\tau}} \qquad \text{Equation-1}$$

where:
exp is 2.718,
t0 is the time of trip,
t is the time from t0 to return of power, and
τ is the thermal time constant of the load.

In Equation-1, Accum(t) defines the value of the accumulator 335 at any time t following a trip event, and Accum($t_0$) defines the value of the accumulator 335 at the time of trip. Alternative cooling characteristics may be employed by using different time constants τ. For example, a first time constant τ1 may be employed to represent the thermal time constant characteristic of one particular motor, and a second time constant τ2 may be employed to represent the thermal time constant characteristic of another particular motor. In an embodiment, the non-volatile memory 350 may be used to store a variety of time constants for use with different sized motors or motors from different manufacturers, which may be user selectable via I/O device 330.

While Equation-1 depicts a certain algorithm for Accum (t), it will be appreciated that this is for illustration purposes only, that other algorithms may be employed, and that the use of other algorithms are contemplated and considered within the scope of the invention.

In an embodiment, and following a trip event, the input/output device 330 displays the value of Accum(t), which is representative of the point on the cooling curve at time t. In an embodiment, the input/output device 330 provides the user with the capability, via a reset button 331 for example, to reset the accumulator 335 to zero, thereby ending the cooling effect calculation to allow an immediate reset and closing of the circuit breaker 100. Alternatively, the input/output device 330 allows the user to modify the cooling effect in progress, such as by selecting a different time constant, or accelerating or decelerating the calculated cooling effect, for example.

In trip units and motor overload relays that are self-powered, the supercapacitor 315 represents a significant startup load, which if uncontrolled, may deteriorate the performance of the trip unit 300. Upon restoring power to the trip unit 300, the trip capacitor 375 must be recharged to provide sufficient energy to activate the flux shifter 400 for subsequent thermal protection. However, during startup, the secondary current from the CTs 200 may not be great enough to support charging both the trip capacitor 375 and the supercapacitor 315. Accordingly, an embodiment includes a control circuit and method to manage supercapacitor startup and charge to ensure proper charging of the trip capacitor 375.

Figure 3:
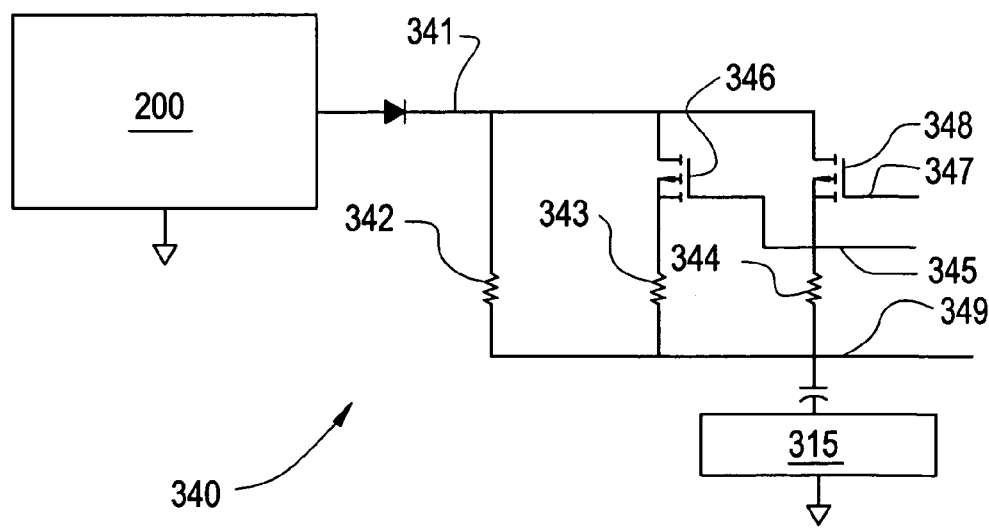
FIG. 3 depicts an exemplary schematic diagram to control the charging of a supercapacitor in accordance with an embodiment of the invention.

FIG. 3 depicts an embodiment of the supercapacitor control circuit 340. Power is supplied via input voltage leg 341, and is routed to the supercapacitor through a combination of parallel charging threshold resistors, 342, 343, and 344. A set of current level switches 346, 348 determine the threshold resistors 342, 343, 344 through which current will flow to recharge the supercapacitor 315. The current level switches 346, 348 are in signal communication with the microprocessor 305 via current level signal connectors 345, 347. In response to power being unavailable from the current transformers 200, such as during a trip event, for example, the real time clock chip 301 receives power from supercapacitor 315 via connector 349.

The amount of charge provided to the supercapacitor 315 is dependent upon primary current flow through the load strap 110. In response to the primary current being below a first threshold (50 percent of the circuit breaker 100 rating for example), the microprocessor will direct both current level switches 346, 348 to remain open, routing the charging voltage through charging resistor 342, which limits the charging current to a first current level of 1 milliamp if resistor 342 has a relatively high value, such as 5 k-ohm. This first stage of charging allows the trip unit 300 or overload relay to properly power up. As the level of primary current increases above the first threshold (of 50 percent, for example), but below a second threshold (of 100 percent, for example) of the circuit breaker 100 rating, the microprocessor 305 will direct current level switch 346 to close. With current level switch 346 closed, the charging voltage will be routed through the paralleled charging resistors 342, 343. In an embodiment, this parallel circuit has a resistance of 121.95 ohms, resulting in a second current level of 41 milliamps of charging current. This second stage of charging is well above the power up level of the trip unit 300, and the CT current has increased to a level that will support faster charging of the supercapacitor 315. In response to the primary current increasing above the second threshold (100 percent of the circuit breaker 100 rating, for example), where the microprocessor 305 starts to accumulate towards a trip condition, the microprocessor 305 directs both current level switches 346, 348 to close. With both current level switches 346, 348 closed, the charging voltage will be routed through paralleled charging resistors 342, 343, and 344. In an embodiment, this parallel circuit has a resistance of 24.08 ohms, resulting in a third current level of 208 milliamps charging current. At this third stage of charging, the CTs 200 can provide a significant amount of current to complete the charging of supercapacitor 315. The aforementioned charging thresholds are selected to prioritize the charging of the trip capacitor 375 for activation of the flux shifter 400, prior to fully charging the supercapacitor 315, if so required. It should be noted that the charging current for the supercapacitor 315 is not a linear function of the current or the square of the current, and that it is simply a charge repository to maintain power to the real time clock chip 310. As such, the charge to supercapacitor 315 need not be accurately stored, but simply needs to be enough.

While the embodiment described herein depicts a three-stage charging method with three specified current level switch points and charging threshold resistance values, it will be appreciated that the disclosed invention is also applicable to other charging methods employing a different number of stages, current level switch points, and threshold resistance values. Further, alternate schemes may be developed that do not require microprocessor intervention, such as the use of analog comparators, for example. Also, the control of charging supercapacitor 315 via the direct monitoring of the charge state of the trip capacitor 375 may be employed. That is, while the trip capacitor 375 is charging, charging of the supercapacitor 315 may be suspended until the trip capacitor 375 is sufficiently charged to actuate the flux shifter 400, at which time the charging of the supercapacitor 315 may begin.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, non volatile memory for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to calculate and manage a cooling effect of an electrical load subsequent to a trip event of a circuit breaker.

As disclosed, some embodiments of the invention may include some of the following advantages: thermal memory to enhance protection for loads exposed to cyclic overloading; enhanced thermal memory accuracy via use of a microprocessor and real time clock chip; the ability to extend thermal memory for loads with large thermal constants up to 21 days using a supercapacitor to provide backup power to a low power real time clock chip; the ability to enhance thermal memory accuracy by selection of the most appropriate thermal constant for a specific load, from a plurality of thermal constants, via an input/output device; the ability to communicate the calculated cooling effect status to the user via an input/output device; and, the ability to reset or modify a cooling calculation in effect via an input/output device.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An electronic trip unit for a circuit breaker, comprising:
   a processing circuit responsive to input signals representative of a current in the circuit breaker, and productive of a trip signal for tripping the circuit breaker;
   a real time clock chip in signal communication with the processing circuit; and
   a power source for powering the real time clock chip in the absence of current in the circuit breaker;
   wherein in response to an off event at the circuit breaker following a current flow condition thereat, the real time clock chip is configured to generate time information for use by the processing circuit;
   wherein in response to the circuit breaker being off as a result of the off event, the processing circuit is configured to apply the time information to calculate a cooling effect arising from the circuit breaker being off, thereby providing for thermal memory.

2. The trip unit of claim 1, wherein:
the off event is a trip event.

3. The trip unit of claim 1, wherein:
the power source comprises a battery.

4. The trip unit of claim 1, wherein:
the power source comprises a supercapacitor.

5. The trip unit of claim 1, wherein:
the processing circuit is configured to apply the time information to one of a plurality of cooling algorithms to calculate the cooling effect.

6. The trip unit of claim 1, further comprising:
an input/output device in signal communication with the processing circuit.

7. The trip unit of claim 6, wherein:
in response to the circuit breaker being off as a result of the off event, the input/output device is configured to display a parameter representative of the calculated cooling effect.

8. The trip unit of claim 6, wherein:
in response to the circuit breaker being off as a result of the off event, the input/output device is configured to allow a user to stop the cooling effect calculation, thereby effectively erasing the thermal memory.

9. The trip unit of claim 6, wherein:
in response to the circuit breaker being off as a result of the off event, the input/output device is configured to allow a user to change the cooling effect calculation, thereby allowing for acceleration or deceleration of the calculated cooling effect.

10. The trip unit of claim 6, wherein:
in response to the circuit breaker being off as a result of the off event, the input/output device is configured to allow a user to select between a plurality of cooling algorithms to calculate the cooling effect.

11. The trip unit of claim 4, further comprising:
a control circuit for controlling the charging of the supercapacitor.

12. The trip unit of claim 11, wherein:
the control circuit is configured to charge the supercapacitor as a function of the current in the circuit breaker.

13. The trip unit of claim 12, wherein:
in response to a first current level in the circuit breaker, the control circuit is configured to charge the supercapacitor at a first current level limited to a first threshold; and
in response to a second current level in the circuit breaker, the control circuit is configured to charge the supercapacitor at a second current level limited to a second threshold greater than the first threshold.

14. The trip unit of claim 13, wherein:
in response to a third current level in the circuit breaker, the control circuit is configured to charge the supercapacitor at a third current level limited to a third threshold greater than the second threshold.

15. The trip unit of claim 4, wherein the circuit breaker comprises a flux shifter responsive to a trip capacitor, and further wherein:

the control circuit is configured to fully charge the supercapacitor only in response to the trip capacitor having sufficient charge to actuate the flux shifter for tripping the circuit breaker.

16. An electronic trip unit for a circuit breaker, comprising:
- a processing circuit responsive to input signals representative of a current in the circuit breaker, and productive of a trip signal for tripping the circuit breaker;
- a real time clock chip in signal communication with the processing circuit;
- a power source for powering the real time clock chip in the absence of current in the circuit breaker; and
- a storage medium, readable by the processing circuit, storing instructions for execution by the processing circuit for:
- applying time information generated by the real time clock chip, the time information being generated in response to an off event at the circuit breaker following a current flow condition thereat, to calculate a cooling effect arising from the circuit breaker being off and cooling down, thereby providing a thermal memory function.

17. The trip unit of claim 16, wherein:
the off event is a trip event.

18. The trip unit of claim 16, wherein:
the storage medium comprises a non-volatile memory chip.

19. The trip unit of claim 16, further comprising:
an input/output device in signal communication with the processing circuit;
wherein the input/output device is configured to display a parameter representative of the calculated cooling effect;
wherein the input/output device is configured to allow a user to select from a plurality of cooling algorithms; and
wherein the input/output device is configured to allow a user to modify the cooling effect calculation to accelerate, decelerate, or reset the cooling effect calculation following an off event.

20. The trip unit of claim 16, wherein:
the power source is a supercapacitor.

* * * * *